United States Patent
Tsai et al.

(10) Patent No.: US 8,314,530 B2
(45) Date of Patent: Nov. 20, 2012

(54) CARBON BRUSH HOLDER WITH IMPROVED AIR VENTS

(75) Inventors: Ping-Fung Tsai, Taipei (TW); Fu-Sheng Liang, Taipei (TW)

(73) Assignee: Victory Industrial Corporation, Hsi-Chih (TW)

( * ) Notice: Subject to any disclaimer, the term of this patent is extended or adjusted under 35 U.S.C. 154(b) by 197 days.

(21) Appl. No.: 12/825,235

(22) Filed: Jun. 28, 2010

(65) Prior Publication Data
US 2011/0001387 A1 Jan. 6, 2011

(30) Foreign Application Priority Data
Jul. 3, 2009 (TW) .............................. 98212140 U

(51) Int. Cl.
*H02K 9/28* (2006.01)
*H02K 5/14* (2006.01)
(52) U.S. Cl. ................................................... 310/239
(58) Field of Classification Search .................. 310/239, 310/227, 240–247; *H02K 9/28, 5/14*
See application file for complete search history.

(56) References Cited

U.S. PATENT DOCUMENTS

| | | | | |
|---|---|---|---|---|
| 4,959,576 A | * | 9/1990 | Horibe et al. | 310/239 |
| 7,417,353 B2 | * | 8/2008 | Wada et al. | 310/239 |
| 7,687,967 B2 | * | 3/2010 | Mashino | 310/239 |
| 2006/0138877 A1 | | 6/2006 | Akabane | |
| 2008/0088197 A1 | | 4/2008 | Okamoto et al. | |

* cited by examiner

*Primary Examiner* — Quyen Leung
*Assistant Examiner* — Thomas Truong
(74) *Attorney, Agent, or Firm* — Clifford B. Perry

(57) ABSTRACT

A carbon brush holder with improved air vents includes a body, a housing, and an exhaust lid, which are provided with corresponding fixing structures for their convenient assembly or disassembly. The exhaust lid is formed with a diverging air channel. By the exquisite configurations of the fixing structures provided on its components, the carbon brush holder is easy to assemble and disassemble so as to facilitate replacement or repair of parts settled in the carbon brush holder. Besides, since the exhaust lid in the present invention has the diverging air channel opened at two sides thereof as the air vents, it significantly improves the efficiency in dust expelling and heat dissipating, thereby effectively preventing the air vent from blocked and preventing overheat caused by poor exhaust.

9 Claims, 5 Drawing Sheets

CARBON BRUSH HOLDER WITH IMPROVED AIR VENTS

BACKGROUND

1. Technical Field

The present invention relates to carbon brushes for vehicle alternators, and more particularly, to a carbon brush holder with improved air vents.

2. Description of Related Art

It is a known technology that an alternator is implemented in a vehicle as a power generating mechanism. During the operation of such a vehicle alternator, the collector ring on the rotor thereof is in close contact with the carbon brush. The mutual friction between the collector ring and the carbon brush is likely to bring the contact surfaces between the both with undesired dust and heat. For improving this, carbon brush shelves have been designed to take dust and heat away from vehicle alternators and thus have housings thereof provided with air vents.

Conventionally, the air vent on the existing carbon brush holder is simply a hole bored on the housing without consideration for smooth airflow. Such design and the like in practice, however, are proven to be ineffective in heat dissipation and exhaust ventilation and thus tend to lead to vent hindrance caused by accumulated dust. Besides, the majority of the existing carbon brush shelves are difficult to assemble and disassemble, and therefore inconvenience their users when any of the components enclosed therein needs to be repaired or replaced.

SUMMARY

In view of the shortcomings of the prior art, it is one objective of the present invention to provide a carbon brush holder with improved air vents that structurally improves the prior art devices.

To achieve this end, the disclosed carbon brush holder with improved air vents includes:

A body having a pair of connection portions located at two sides of the body and near a front end of the body; a positioning post rising from an upper surface of the body; and a pair of grooves formed at two lateral walls of the body and near a rear end of the body;

a housing detachably fixed to the front end of the body, and being an arched member with upper and lower ends thereof opened so that the housing and the body, when assembled, jointly define a receiving space, the housing including: a pair of connection portions formed at two sides of the housing and near a rear end of the housing for corresponding to the connection portions of the body, so that the connection portions, when assembled, make the housing and the body positioned with respect to each other; and at least one button located at an outer surface of a front end of the housing and near an upper edge of the housing, wherein each said button is spaced from another said button; and an exhaust lid being slightly flexible and detachably mounted onto the assembled body and housing for closing the receiving space included by the body and the housing, wherein the exhaust lid is a chunk with a predetermined thickness and includes: an accommodating recess formed on a lower surface of the exhaust lid corresponding to the receiving space included by the body and the housing; an air channel formed on the lower surface of the exhaust lid and extending rearward from the accommodating recess, wherein the air channel has a rear end diverging and extending toward two sides of the exhaust lid so as to be opened to the exterior as the air vents; a positioning socket formed at the lower surface of the exhaust lid for corresponding and thus fittingly receiving the positioning post; two retaining hooks formed at two lateral walls of the exhaust lid for corresponding and thus engaging with the grooves of the body; and at least one buckle provided at a front end of the exhaust lid for corresponding and thus coupling with the button.

By the exquisite configurations of the fixing structures provided on its components, the carbon brush holder of the present invention is easy to assemble and disassemble so as to facilitate replacement or repair of parts settled in the carbon brush holder. Besides, since the exhaust lid in the present invention has the diverging air channel opened at two sides thereof as the air vents, it significantly improves the efficiency in dust expelling and heat dissipating, thereby effectively preventing the air vent from blocked and preventing overheat caused by poor exhaust.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF EXEMPLARY EMBODIMENTS

Figure 1:
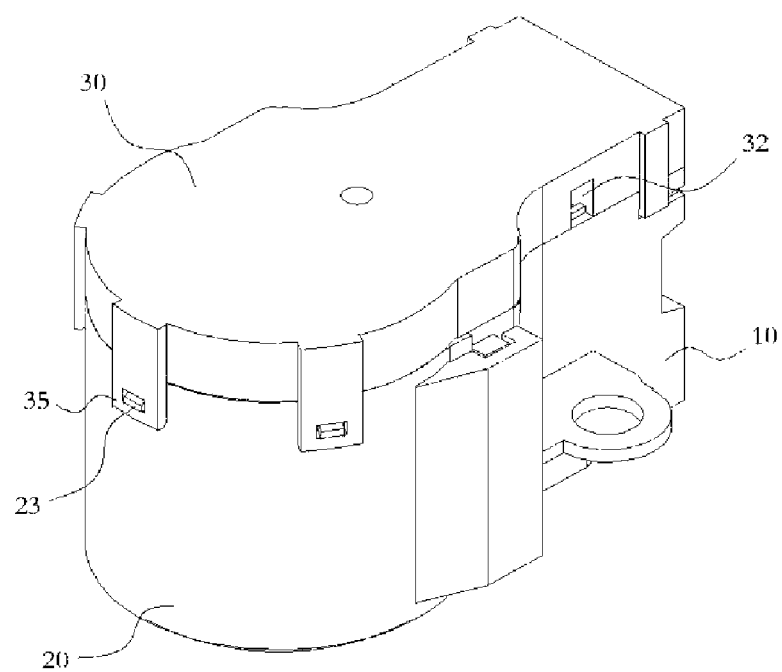
FIG. 1 is a perspective view of the subject matter of the present invention.
Figure 2:
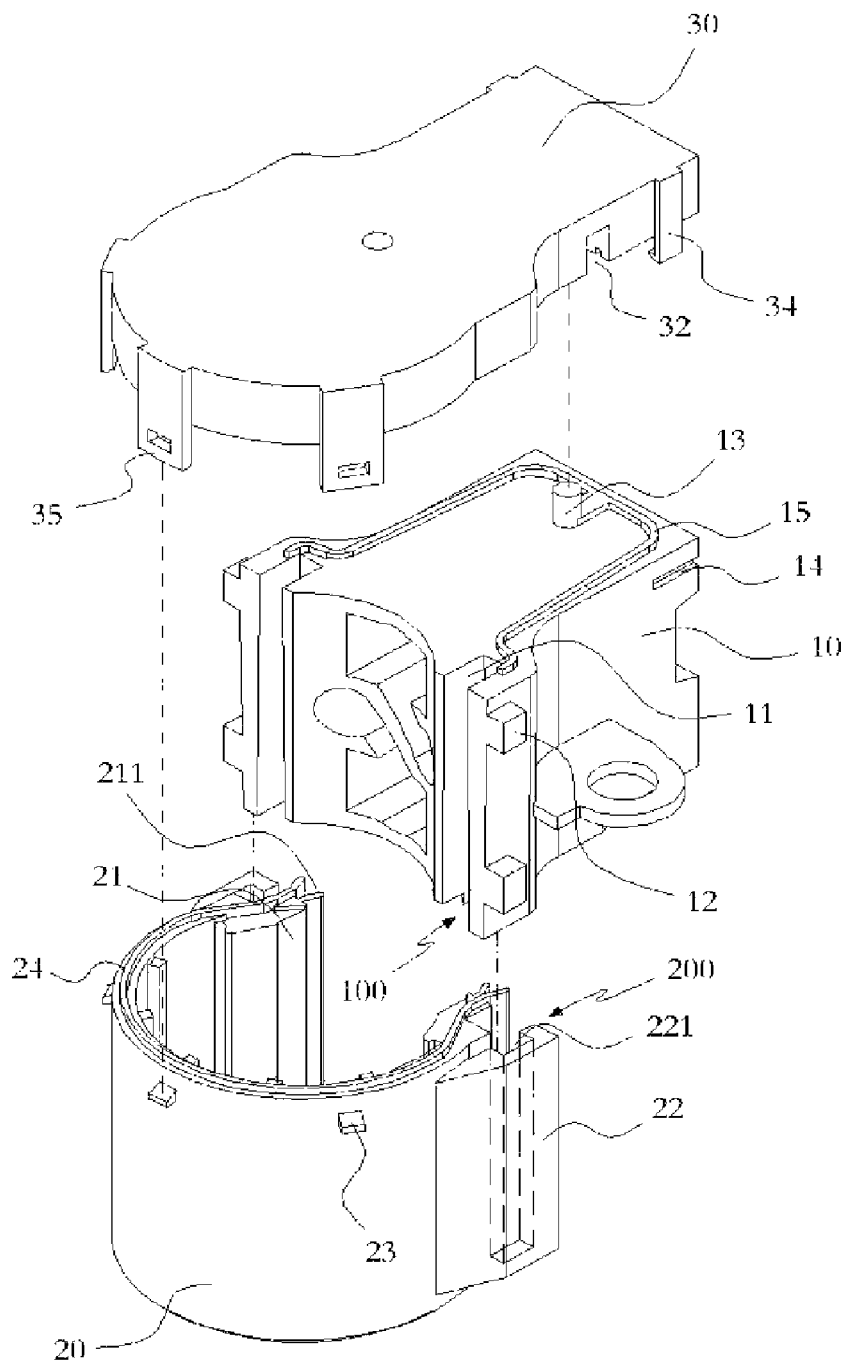
FIG. 2 is an exploded view of the subject matter of the present invention.
Figure 3:
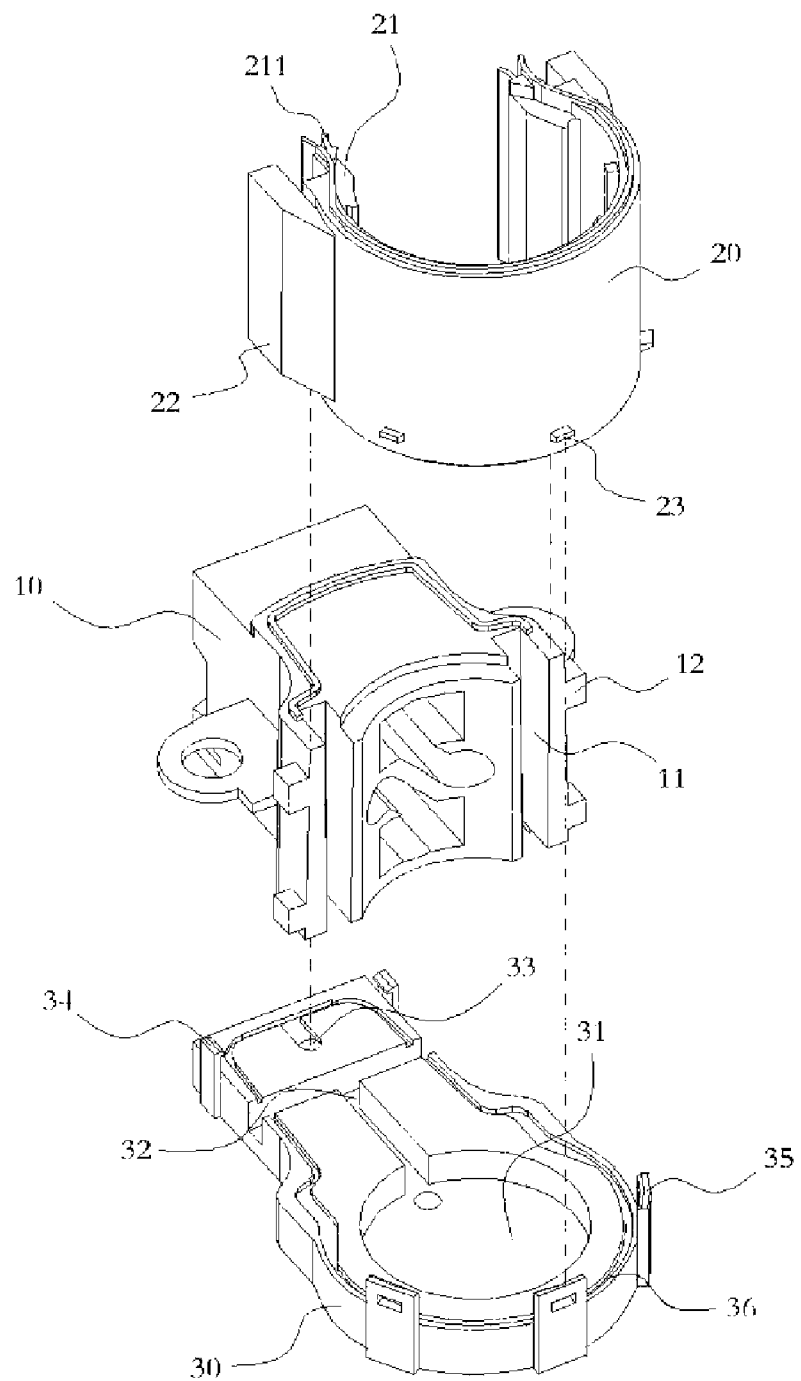
FIG. 3 is another exploded view of the subject matter of the present invention taken from an angle different from that of FIG. 2.
Figure 4:
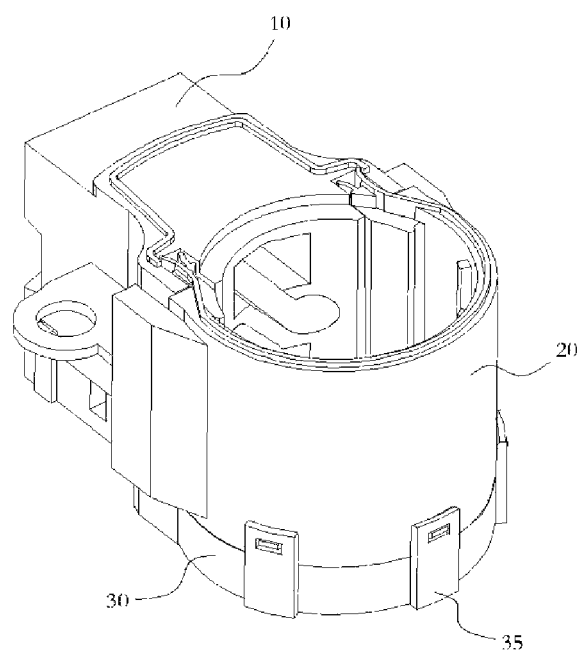
FIG. 4 is another perspective view of the subject matter of the present invention taken from an angle different from that of FIG. 1.
Figure 5:
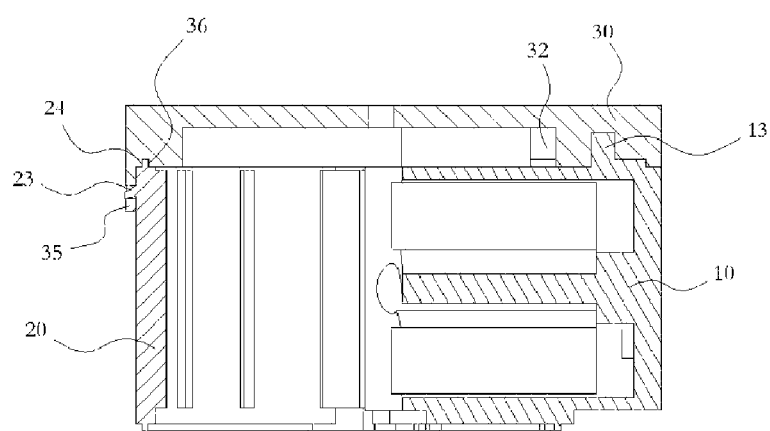
FIG. 5 is a sectional view of the subject matter of the present invention.

While the present invention proposes a carbon brush holder, the physical and mechanical principles implemented therein have been known to one skilled in the art and need not to be discussed at any length herein. Meanwhile, the accompanying drawings referred to in the following description are provided for illustrative purposes and need not to be made to scale Referring to FIGS. 1 through 5, according to an embodiment of the present invention, a carbon brush holder with improved air vents includes a body 10, a housing 20, and an exhaust lid 30.

The body 10 has a pair of connection portions 100 located at two sides near a front end thereof. Each of the connection portions 100 includes a retaining recess 11 depressed from a front end of the body 10, and at least one retaining block 12 jutting out of a front lateral edge of the body 10. A positioning post 13 rises from an upper surface of the body 10, while a pair of grooves 14 is formed at two lateral walls near a rear end of the body 10. Furthermore, a parapet 15, designed for repelling dust and water, rises from the upper surface of the body 10 and extends along a periphery of the latter.

The housing 20, which is detachably fixed to the front end of the body 10, is an arched member with its upper and lower ends opened so that the housing 20 and the body 10, when assembled, jointly define a receiving space. The housing 20 has a pair of connection portions 200 formed at two sides near a rear end thereof for corresponding to the connection portions 100, respectively. Each of the connection portions 200 of the housing 20 includes an engaging rib 21 jutting out of an inner periphery of the housing 20 near the rear end of the housing 20. The engaging rib 21 is configured to be inserted into a corresponding said retaining recess 11 and positioned by the retaining recess 11. In addition, each of the engaging ribs 21, at a rear end thereof, includes an extending wall assembly 211 that has a flared transverse sectional shape. Each said connection portion 200 further comprises an arm 22 stretching rearward from an outer surface of a corresponding lateral wall near the rear end of the housing 20. The arm 22 has a vertically extending sliding groove 221 that has an opening at an upper end of the arm 22 but not passes through the arm 22. The sliding groove 221 corresponds to the retaining block 12 for receiving the latter so as to retain the retaining block 12 from transversely shifting, thereby positioning the housing 20 and the body 10 with respect to each other. Moreover, three buttons 23 are located at an outer surface of a front end near the upper edge of the housing 20 and spaced from each other. Furthermore, a parapet 24, designed for repelling dust and water, rises from the upper edge of the housing 20 and extends along a periphery of the latter.

The exhaust lid 30 is made of a slightly flexible plastic material to be detachably mounted onto the assembled body 10 and the housing 20, thereby closing the receiving space included by the body 10 and the housing 20. The exhaust lid may be a chunk with a predetermined thickness, and has a lower surface formed with an accommodating recess 31 corresponding to the receiving space included by the body 10 and the housing 20. An air channel 32 formed on the lower surface of the exhaust lid 30 extends rearward from the accommodating recess 31 and has a rear end thereof diverging and extending toward two sides of the exhaust lid 30 so as to be opened to the exterior as the air vents. In the present embodiment, the air channel 32 is a T-shaped channel. Besides, a positioning socket 33 is formed at the lower surface of the exhaust lid 30 for corresponding and thus fittingly receiving the positioning post 13. Furthermore, the exhaust lid 30 has two retaining hooks 34 formed at two lateral walls thereof for corresponding and thus engaging with the grooves 14 of the body 10 as a fixing means. In addition, the exhaust lid 30 has its front end provided with three buckles 35 for corresponding and thus coupling with the buttons 23 of the housing 20. When the buckles 35 are combined with the buttons 23, the both jointly serve to fix the exhaust lid 30 to the housing 20 and the body 10. Besides, a lid groove 36 is formed at the lower surface of the exhaust lid 30 corresponding to the parapet 15 of the body 10 and the parapet 24 of the housing 20. By the fit match of the assembled lid groove 36 and parapets 15, 24, foreign matters, such as external water and dust, can be prevented from entering the carbon brush holder.

The carbon brush holder of the present invention benefits from the exquisite configurations of the fixing means provided on its components, thus being easy to assemble and disassemble so as to facilitate replacement or repair of parts settled in the carbon brush holder. Besides, since the exhaust lid 30 in the present invention has the diverging air channel 32 opened at two sides thereof as the air vents, it significantly improves the efficiency in dust expelling and heat dissipating, thereby effectively preventing the air vent from blocked and preventing overheat caused by poor exhaust.

The present invention has been described with reference to one embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A carbon brush holder with improved air vents, comprising:
   a body including:
      a pair of connection portions located at two sides of the body and near a front end of the body;
      a positioning post rising from an upper surface of the body; and
      a pair of grooves formed at two lateral walls of the body and near a rear end of the body;
   a housing detachably fixed to the front end of the body, and being an arched member with upper and lower ends thereof opened so that the housing and the body, when assembled, jointly define a receiving space, the housing including;
      a pair of connection portions formed at two sides of the housing and near a rear end of the housing for corresponding to the connection portions of the body, so that the connection portions, when assembled, make the housing and the body positioned with respect to each other; and
      at least one button located at an outer surface of a front end of the housing and near an upper edge of the housing, wherein each said button is spaced from another said button;
   an exhaust lid being slightly flexible and detachably mounted onto the assembled body and housing for closing the receiving space included by the body and the housing, wherein the exhaust lid is a chunk with a predetermined thickness and includes:
      an accommodating recess formed on a lower surface of the exhaust lid corresponding to the receiving space included by the body and the housing;
      an air channel formed on the lower surface of the exhaust lid and extending rearward from the accommodating recess, wherein the air channel has a rear end diverging and extending toward two sides of the exhaust lid so as to be opened to the exterior as the air vents;
      a positioning socket formed at the lower surface of the exhaust lid for corresponding and thus fittingly receiving the positioning post;
      two retaining hooks formed at two lateral walls of the exhaust lid for corresponding and thus engaging with the grooves of the body; and
      at least one buckle provided at a front end of the exhaust lid for corresponding and thus coupling with the button.

2. The carbon brush holder of claim 1, wherein each of the connection portions of the body includes a retaining recess depressed from a front end of the body, and at least one retaining block jutting out of a front lateral edge of the body, while each of the connection portions of the housing includes an engaging rib jutting out of an inner periphery of the housing and near the rear end of the housing, the engaging rib being inserted in and retained by a corresponding said retaining recess, each of the connection portions of the housing further including an arm stretching rearward from an outer surface of a corresponding lateral wall of the housing and near the rear end of the housing, the arm having a vertically extending sliding groove that has an opening at an upper end of the arm but not passes through the arm, the sliding groove corresponding to the retaining block for receiving the retaining block so as to retain the retaining block from transversely shifting.

3. The carbon brush holder of claim 2, wherein the engaging rib has a rear end extended with an extending wall assembly that has a flared transverse sectional shape.

4. The carbon brush holder of claim 1 or 2, wherein the air channel is a T-shaped channel.

5. The carbon brush holder of claim 3, wherein the air channel is a T-shaped channel.

6. The carbon brush holder of claim 1 or 2, wherein a parapet rises from the upper surface of the body and extends along a periphery of the body, and a parapet rises from the upper edge of the housing and extends along a periphery of the housing, while a lid groove is formed at the lower surface of the exhaust lid corresponding to the parapet of the body and the parapet of the housing.

7. The carbon brush holder of claim 3, wherein a parapet rises from the upper surface of the body and extends along a periphery of the body, and a parapet rises from the upper edge of the housing and extends along a periphery of the housing, while a lid groove is formed at the lower surface of the exhaust lid corresponding to the parapet of the body and the parapet of the housing.

8. The carbon brush holder of claim 4, wherein a parapet rises from the upper surface of the body and extends along a periphery of the body, and a parapet rises from the upper edge of the housing and extends along a periphery of the housing, while a lid groove is formed at the lower surface of the exhaust lid corresponding to the parapet of the body and the parapet of the housing.

9. A carbon brush holder with improved air vents, comprising:
- a body including:
  - a pair of connection portions located at two sides of the body and near a front end of the body;
  - a positioning post rising from an upper surface of the body; and
  - a pair of grooves formed at two lateral walls of the body and proximate to a rear end of the body;
- a housing detachably fixed to the front end of the body, and being an arched member with upper and lower ends thereof opened so that the housing and the body, when assembled, jointly define a receiving space; and
- a exhaust lid detachably mounted onto the body and housing for closing the receiving space included by the body and the housing, the exhaust lid including:
  - an air channel formed on a lower surface of the exhaust lid, wherein the air channel has a rear end diverging and extending toward two sides of the exhaust lid so as to be opened to the exterior as the air vents.

* * * * *